Patented July 22, 1924.

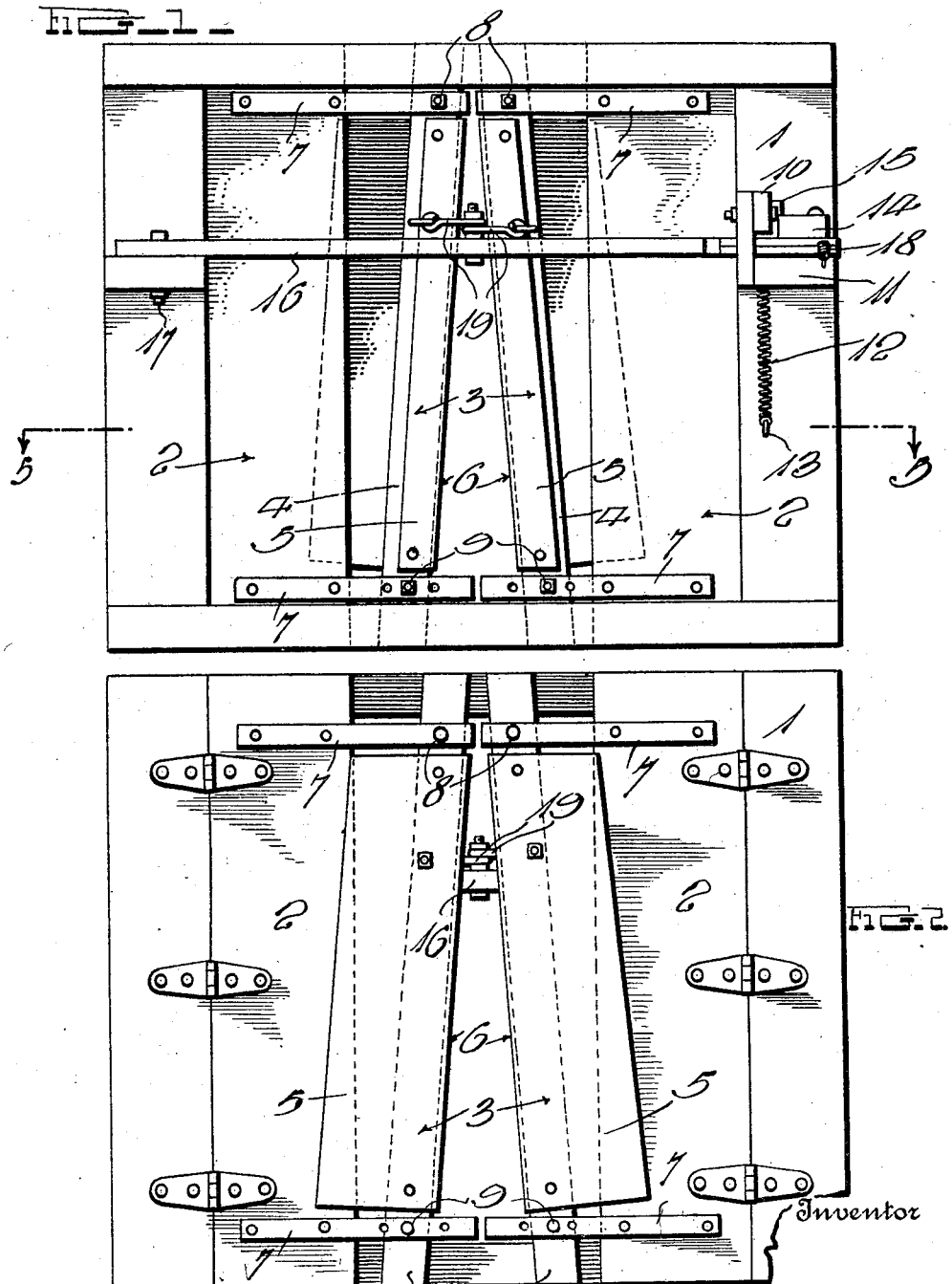

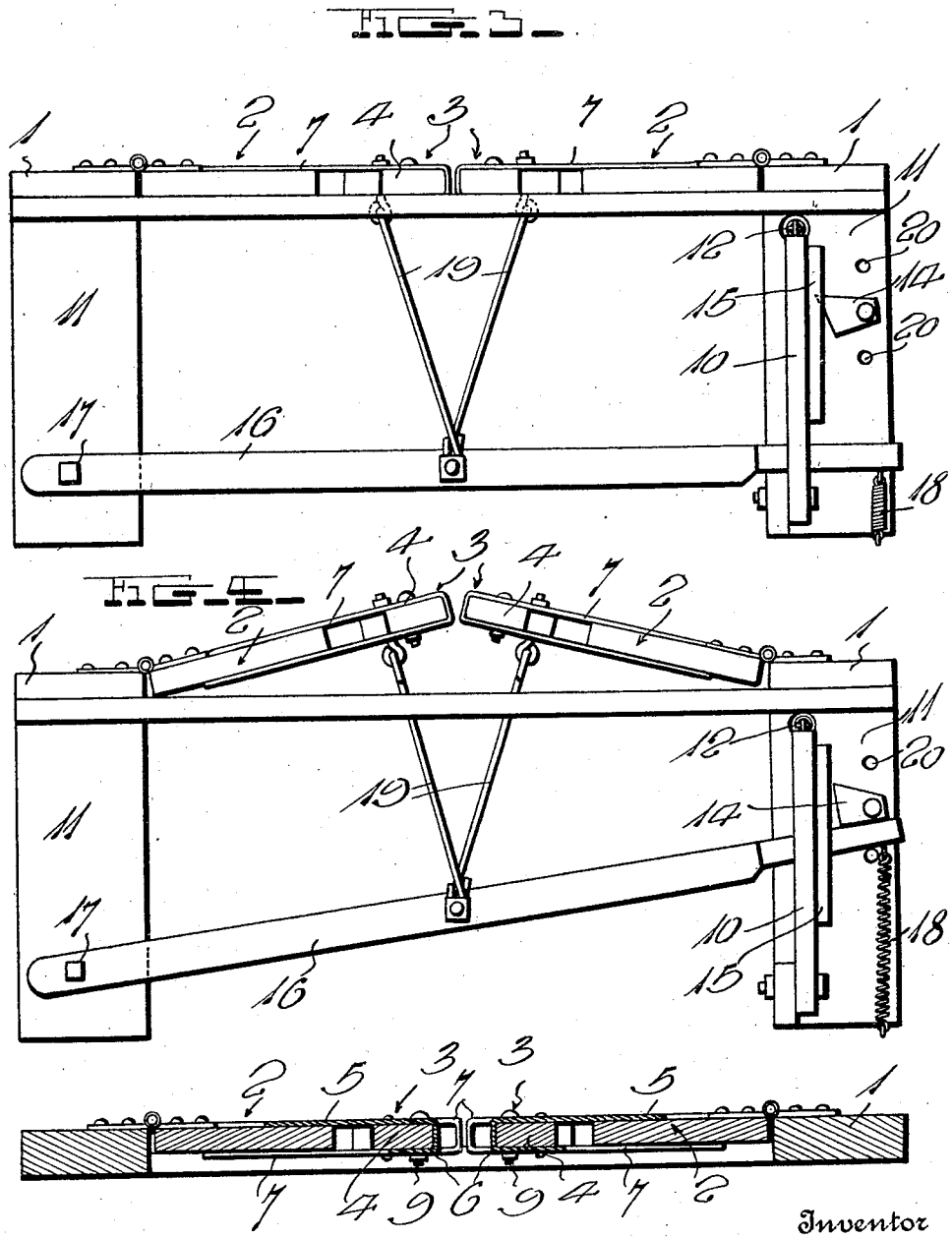

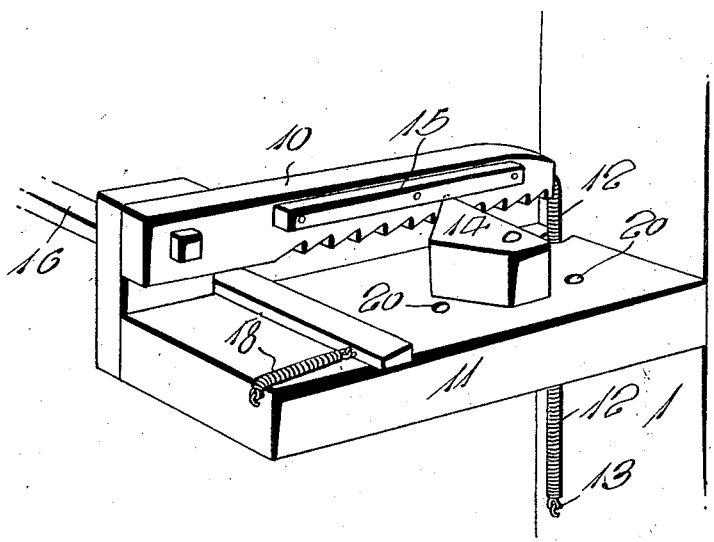
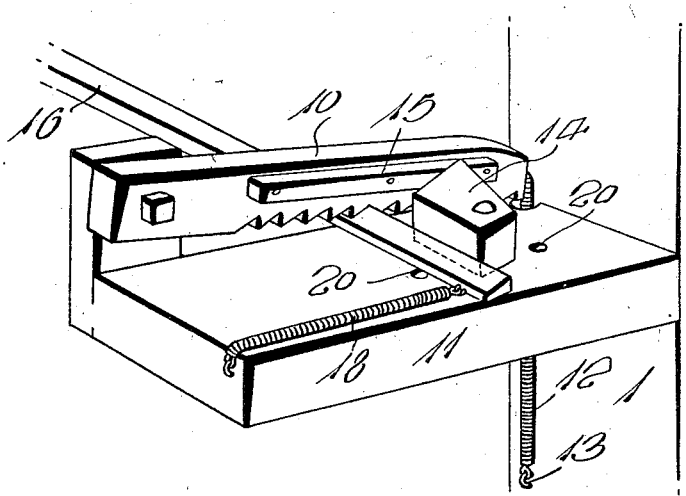

1,502,155

UNITED STATES PATENT OFFICE.

JOSEPH A. O'BRIEN, OF BROOKSTON, INDIANA, ASSIGNOR OF ONE-HALF TO JAMES N. KIRKPATRICK, OF LA FAYETTE, INDIANA.

HOG TRAP.

Application filed December 9, 1921. Serial No. 521,236.

*To all whom it may concern:*

Be it known that I, JOSEPH A. O'BRIEN, a citizen of the United States, residing at Brookston, in the county of White and State of Indiana, have invented certain new and useful Improvements in Hog Traps; and I do declare the following to be a full, clear, and exact description of the invention, such as will enable others skilled in the art to which it appertains to make and use the same.

This invention relates to an improved animal trap which is especially, but not necessarily, designed for catching and holding hogs while they are being branded, ringed, or otherwise operated upon.

The principal object of the invention is to improve upon devices of this class by providing one of extreme simplicity and durability which will effectively accomplish ends sought, will not injure the hog, and will positively and effectively operate effectively and automatically after being set and properly adjusted.

Another and a very important object of the invention is to provide a trap of this class which embodies swinging animal engaging devices, preferably in the form of closures, these having their adjacent vertical edges spaced apart so as to enable this space to be occupied by novel means, preferably stanchions, for enabling the trap to more effectively grip and accommodate different sizes of animals.

A further and also a very important feature and object of the invention is to devise a trap which embodies the aforesaid swinging closures, having associated therewith normally inoperative closure-controlled means for locking the closures against return to their divergent positions after they are moved rearwardly by the hog attempting to escape.

A still further object of the invention is to provide a trap wherein the means for accomplishing the above end is a great deal simpler than heretofore employed on prior patented and marketed traps, the construction and arrangement of parts being such as to practically insure positive operation when occasion demands and there being little or no possibility of parts binding and failing to operate.

Other objects and advantages of the invention will be apparent during the course of the following description.

In the accompanying drawings forming a part of this specification and in which like numerals are employed to designate like parts throughout the same:

Figure 1 is a rear elevational view of a hog trap constructed in accordance with this invention.

Figure 2 is a front elevational view thereof.

Figure 3 is a top plan view showing the animal engaging devices in their normal inoperative position.

Figure 4 is a similar view showing said devices in divergent relation and the other parts moved to the position they assume at this time.

Figure 5 is a horizontal section taken substantially on the plane of the line 5—5 of Fig. 1.

Figure 6 is an enlarged detail perspective view of the locking means for the closure showing the parts thereof in their normal positions.

Figure 7 is a view like Figure 6 showing the parts of the locking means assuming their operative positions.

In carrying out the invention, I make use of a supporting frame 1 of any suitable construction having an opening through which the hog is adapted to pass, this opening being closed by hinged doors 2 which are normally positioned in alignment as shown in Fig. 3, but are designed to be moved to the diverging positions indicated in Fig. 4 when operative. As before indicated, the inner adjacent vertical edges of these doors are spaced from each other and this space is occupied by novel adjustable means which is designed to directly grip the neck of the hog. Specifically described, this novel gripping means comprises a pair of stanchions 3, one being carried by each door and each being formed from a strip of material 4 carrying a metal plate 5 which covers the space between the strip and door and slidably contacts the latter. In securing the metal to the strip, it is bent around the same as indicated at the points 6 in Fig. 5. For the purpose of pivotally and adjustably connecting the stanchions with the doors, I provide U-straps 7 which are secured to the doors against the upper and lower ends of the latter and extend beyond the vertical edges thereof. At the top, the stanchions are pivotally and detachably connected to the adjacent straps as indicated at the points 8, while at the bottoms they are adjustably connected with the straps as indicated at the points 9. Hence, it will be seen that the lower portions of the stanchions may be swung away from each other to increase or decrease the space between them to accommodate different sizes of animals. Consequently, there is little or no chance of choking or otherwise injuring the animal, because this can be overcome by properly adjusting the stanchions before each operation of the trap.

As before indicated, novel and advantageous means is employed for locking the doors in different divergent positions and this means is controlled by the doors and has operative connection therewith so as to eliminate an unnecessary number of elements such as is at the present time employed for accomplishing the same end. The preferred means for carrying out the ends under consideration comprises broadly, normally inoperative retaining means, means for rendering the same operative, and other means controlled by the doors for acting on the second means to render the latter inoperative, whereby the retaining means is automatically brought into play. Specifically described, the retaining means is a pivoted rack bar 10 mounted on one of the rear horizontal extensions 11 of the supporting frame. By directing attention to Figs. 6 and 7 it will be seen that the member 10 is pivoted at its end remote from the frame and its opposite free end has a coiled spring 12 connected therewith and passing downwardly through a hole in the extension 11 and anchored in its lower end as indicated at 13. As before indicated, this rack bar is normally held inoperative and for accomplishing this end I preferably employ a pivoted release 14 in the form of a block, the same having its pointed end arranged beneath a shoulder forming strip 15 secured to the rack bar in the manner shown. This release is manually set at each operation of the trap. It may be stated here that in addition to providing means for permitting the rack bar to move to its effective position, this release member also functions as a stop which comes into play in a manner to be hereinafter set forth. Co-operative with the parts above described, is a horizontally disposed lever 16 which is pivoted at one end as at 17 to the remaining extension 11, its opposite end being free and extending beneath the raised rack bar as disclosed in Fig. 6 and there being a coiled spring 18 connected therewith and with the adjacent extension for holding it in the position shown in this figure and for serving a purpose to be made apparent later. It will be noted that the free end of this lever is shaped differently from the body portion thereof to enable it to effectively co-act with the teeth of the rack bar. It will also be noted that the lever has direct connection intermediate its ends with the stanchions through the medium of links 19. These links could, of course, be connected directly to the doors if desired. By referring again to the release device 14 it will be seen this is adjustable toward and from the supporting frame to limit the extreme divergence of the closures and to enable the divergence to be varied and controlled by simply placing the pivot pin in any one of the unoccupied holes 20.

The operation of the trap is as follows: It is placed across the end of chute or passageway into which the hog is designed to be driven. When the hog reaches the trap, he thrusts his head against the closed doors and stanchions which are then in the position disclosed in Fig. 3. In so doing, the doors are moved to the divergent position indicated in Fig. 4 and they are permitted to move only until the lever 16 is brought into engagement with the stop 14. When this happens, the doors are prevented from further forward movement and the animal seeing that he cannot get through the limited space, naturally moves backward and attempts to escape in this way. As soon as he moves in this direction, the aforesaid coiled spring 18 acts to maintain the stanchions in engagement with the animal's neck. At the time the member 14 is struck in the initial forward movement of the animal and is acting in the capacity of a stop, it is also moved on its pivot so that it is swung clear of the shoulder strip 15. The rack bar 10 is therefore allowed to drop down under the action of the spring 12 so that it assumes the position indicated in Fig. 7. It therefore follows that as the animal moves rearwardly, the free end of the lever ratchets over the teeth of the rack bar and engages with one nearer the pivot of the latter. The doors are therefore locked against movement forward in case the hog pushes in this direction again. It is of course understood that before the animal is allowed to enter the chute, the release and stop member 14 is manually set so as to hold the rack bar inoperative until the pivoted lever comes into engagement therewith. It is also understood that the stanchions are properly adjusted to accommodate the particular size of hog to be operated upon. When the hog is trapped, it will be a comparatively easy matter to operate upon him or otherwise treat him.

Attention is directed to the fact that during the course of the description the terms "animal engaging devices" have been used to indicate in a broad sense the doors and stanchions and in construing the claims it is desired where "door or closures" are used that these terms be considered broadly to mean the same thing. In other words, both of the above expressions should be considered as equivalents.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A device of the class described comprising a pair of animal engaging devices normally positioned in alinement and adapted to assume divergent relations when operative, a separate pivotally mounted rack bar, said bar being independently operable with respect to said devices, and means for rendering said bar operative, said means being controlled by said devices, being normally disconnected from said bar, but being engaged with the teeth thereof when the devices assume predetermined divergent positions and the bar is released to move to operative position, whereby to prevent further movement of the devices in one direction.

2. The structure set forth in claim 1, together with a retractable release normally engaged with and holding said bar inoperative, a part of said first named means being engageable with the release means at a predetermined time for disengaging it from the bar.

3. A device of the class described comprising a pair of normally alined movable animal gripping devices, a pivoted lever having connection with said devices, and normally inoperative animal actuated means co-operative with the free end of the lever for limiting the forward movement thereof and for holding it in various positions when moved rearwardly when said animal gripping devices are moved in a corresponding direction by the animal attempting to escape.

4. In an animal trap, a frame, animal engaging devices mounted on said frame, a lever pivoted to said frame, links connected to said lever and said animal engaging devices for holding same normally shut, a rack bar for engaging said lever and through same maintaining said animal engaging devices in least possible divergence when once opened, and a stop adapted to hold said rack bar normally inoperative.

5. In an animal trap, a frame, animal engaging devices mounted on said frame, a lever pivoted to said frame, links connected to said lever and said animal engaging devices, a rack bar for engaging said lever, a shoulder strip on said rack bar, and a stop pivotally mounted on said frame and adapted to ride under the shoulder strip on said rack bar for holding same in elevated and normally inoperative position.

6. A device of the class described comprising a pair of swinging closures, a pivoted rack bar associated with said closures, a pivoted lever having connection with said closures and having its free end engaged with said rack bar, and means for holding said rack bar normally inoperative until said means is acted on by said lever.

7. The structure set forth in claim 6, said means being a combined stop and release, whereby it functions additionally to limit the forward movement of the lever.

8. A device of the class described comprising a pair of normally alined closures adapted to be moved to relative diverging positions by an animal, supporting means for said closures, a rack bar pivotally mounted on said supporting means, a spring connected to and exerting downward pull on the free end of the rack bar, a pivoted release engaged with said bar for holding it normally in inoperative position, a lever pivotally mounted on the support and adapted to have its free end engaged with the teeth of said rack bar when the latter is moved to operative position, means connecting the intermediate portion of the lever with the aforesaid closures, and a spring connected with the free end of said lever for exerting a rearward pull thereon for maintaining the aforesaid closures in engagement with the animal's neck when he attempts to escape.

9. The structure as set forth in claim 8, said release device also having the function of a stop for limiting the forward movement of the lever, whereby to permit the degree of divergence of the closure to be controlled.

10. A device of the class described comprising a supporting frame, a pair of hingedly mounted doors supported thereon and having their inner vertical edges spaced apart, adjustable stanchions mounted on the inner vertical edges of the doors for directly engaging the animal, a pivoted rack bar on the support, said bar being provided with a shoulder, a spring connected to the free end of said bar for exerting a downward pull thereon, a pivoted and adjustable combined stop member and release normally engaged with said shoulder, a lever pivoted on said support and having its free end engaged with the teeth of said rack bar when the latter is in operative position, linkage connecting said lever with said stanchions, and spring means connected to the free end of the lever for exerting a rearward pull on the latter.

11. In an animal trap, a frame, animal engaging devices mounted on said frame, a lever pivoted to said frame, links connected to said lever and said animal engaging devices, means for engaging said lever and maintaining said animal engaging devices in least possible divergence when once opened and means for holding said first mentioned means normally inoperative.

12. In an animal trap, a frame, animal engaging devices mounted on said frame, a pivoted lever carried by said frame and connected to said animal engaging devices for holding same normally shut, a rack bar for engaging said lever and maintaining said animal engaging device in least possible divergence when once opened, and means controlled by the lever for holding said rack normally inoperative.

13. A device of the class described comprising supporting means, a pair of closures hingedly connected thereto, said closures having their inner vertical edges spaced apart, connecting means at the upper and lower portions of said closures, a pair of stanchions, means for pivotally connecting said stanchions at their upper ends to the upper connecting means, and means for adjustably connecting them at their lower ends to the remaining connecting means.

14. A stanchion for use in connection with a device of the class described comprising a vertically disposed strip, and a metal plate secured to said strip, having one end bent around the latter, and its opposite end extending beyond the strip and being adapted to cover a space and slidably contact a door as described.

In testimony whereof I have hereunto set my hand.

JOSEPH A. O'BRIEN.